United States Patent
Ha

(10) Patent No.: US 8,809,413 B2
(45) Date of Patent: Aug. 19, 2014

(54) ULTRAVIOLET RADIATION-CURABLE HIGH REFRACTIVE INDEX OPTICALLY CLEAR RESINS

(76) Inventor: Chau Ha, Chicago, IL (US)

( * ) Notice: Subject to any disclaimer, the term of this patent is extended or adjusted under 35 U.S.C. 154(b) by 288 days.

(21) Appl. No.: 13/171,813

(22) Filed: Jun. 29, 2011

(65) Prior Publication Data

US 2013/0004676 A1    Jan. 3, 2013

(51) Int. Cl.
| | |
|---|---|
| C08F 222/20 | (2006.01) |
| C08F 2/50 | (2006.01) |
| C08F 2/46 | (2006.01) |
| C08K 5/36 | (2006.01) |
| C08F 220/30 | (2006.01) |
| C08F 222/10 | (2006.01) |

(52) U.S. Cl.
CPC .............. C08F 2/50 (2013.01); C08F 220/30 (2013.01); *C08F 222/1006* (2013.01)
USPC ................... 522/92; 522/33; 522/79; 522/82; 522/103; 522/181; 522/184; 522/186

(58) Field of Classification Search
USPC .......... 522/92, 82, 33, 103, 79, 181, 184, 186
See application file for complete search history.

(56) References Cited

U.S. PATENT DOCUMENTS

| | | | | |
|---|---|---|---|---|
| 5,146,531 | A | * | 9/1992 | Shustack ....................... 385/128 |
| 5,969,867 | A | * | 10/1999 | Fukushima et al. .......... 359/581 |
| 6,617,371 | B2 | | 9/2003 | Ha |
| 6,850,681 | B2 | | 2/2005 | Lepont et al. |
| 7,087,659 | B2 | * | 8/2006 | Chisholm et al. ................ 522/64 |
| 2003/0091310 | A1 | * | 5/2003 | Myers ............................ 385/128 |
| 2006/0068207 | A1 | | 3/2006 | Mercado et al. |
| 2007/0010623 | A1 | | 1/2007 | Ha |
| 2008/0206489 | A1 | | 8/2008 | Chen |
| 2009/0197986 | A1 | * | 8/2009 | Lee et al. .......................... 522/6 |
| 2009/0252885 | A1 | | 10/2009 | Ha |

OTHER PUBLICATIONS

Voelekel, et al, Technology Trends of Microlens Imprint Lithography and Wafer Level Cameras (WLC), MOC'08, Conference on Micro-Optics, Brussels, Belgium, Sep. 25-27, 2008.

\* cited by examiner

*Primary Examiner* — Satya Sastri
(74) *Attorney, Agent, or Firm* — Mitchell A. Rossman; Terra Nova Patent Law, PLLC

(57) ABSTRACT

Various radiation-curable compositions for making optically clear high refractive index materials are provided. The radiation-curable compositions include: one or more aryl-containing compounds including one or more ethylenically unsaturated moieties: one or more reactive diluent compounds including an ethylenically unsaturated moiety; one or more heat-stabilizing compounds; and one or more photo initiators. Various methods of making optically clear high refractive index coatings are also provided.

9 Claims, No Drawings

# ULTRAVIOLET RADIATION-CURABLE HIGH REFRACTIVE INDEX OPTICALLY CLEAR RESINS

BACKGROUND OF THE INVENTION

Mobile phone camera is becoming an essential part of mobile phones. Today, it is difficult to find a mobile phone without a digital camera. In the near future, it is expected that the majority of mobile phones or smart phones will have two cameras, a primary high resolution mega-pixel camera for photography and a video graphics array camera for video calls. As the market for mobile phones continues to grow at an explosive rate, the demand for mobile phone cameras is expected to be high. The expectation for mobile phone cameras is that they will get better and cheaper, and they will remain an integral part of the mobile phone. Current mobile phone cameras consist of greater than 10 different components including plastic or glass molded lenses, pupils, baffles, actuators, lens holders, lens barrel, color filters, and image sensors. These components are being manufactured and assembled by many different suppliers, thus, the unit costs are relatively high. The wafer level camera is the anticipated next generation mobile phone camera. Wafer level camera is considerably simple than current phone cameras and offers up to 50% manufacturing cost reduction. All components are produced on an 8" wafer. The wafer-level-optic lens is mounted together with the CMOS (Complementary metal oxide semiconductor) wafer, and the wafer stack is diced into the individual camera modules.

The two major advantages wafer level cameras offer to mobile phone makers over traditional image sensors are large cost reductions, and reductions in size. The cost reduction potential of wafer level camera has driven major mobile phone companies to promote wafer level camera as the ultimate technology for next generation low cost mobile phone cameras.

One of the major challenges for ultraviolet micro lithography in making optical wafers by the replication method is the lack of suitable photopolymer materials. For a photopolymer material to be suitable for wafer-level-optic lens, it must be appropriate for high throughput imprint lithography, stable for solder reflow temperatures at about 260° C., optically clear, and display long lifetime stability in harsh environments (heat, humidity and sunlight). Moreover, for the lens designs, a choice of different lens materials with refractive indices of about 1.52 to about 1.65 at about 589 nm wavelength may be desired. Currently, most optically clear photopolymers do not meet both the requirement of high refractive index and stability at solder reflow temperatures.

What is needed is radiation-curable composition for making optically clear high refractive index materials that does not have the problems found in the current art.

SUMMARY OF THE INVENTION

The present invention provides ultraviolet-curable high refractive index optically clear resins that can be used for nano-imprint lithography or step and flash imprint lithography for fabrication of wafer-level-optic lens for wafer level camera for mobile phone applications. These photopolymer materials are useful for making optical wafers by ultraviolet replication or ultraviolet micro lithography to produce wafer-level-optic lens that meet the requirements for use in wafer level cameras for mobile phone applications. For a photopolymer to be useful for making wafer-level-optic lens, four parameters should be met. First, the cured resin should be optically clear. Second, the cured resin should have a refractive index in the range of about 1.52 to about 1.65 at about 589 nm. Third, the cured resin should be stable to and non-yellowing under solder reflow conditions of about 260° C. for about 5 minutes. Fourth, the cured resin should have high hardness so that it is suitable for dice cutting. The present invention provides photopolymer materials that meet these parameters.

The present invention provides a radiation-curable composition for making optically clear high refractive index materials. The composition includes: one or more aryl-containing compounds including one or more ethylenically unsaturated moieties: one or more reactive diluent compounds including an ethylenically unsaturated moiety; one or more heat-stabilizing compounds; and one or more photo initiators, wherein the one or more photo initiators absorb radiation from about 200 nanometers to about 400 nanometers.

In one embodiment, the one or more aryl-containing compounds including one or more ethylenically unsaturated moieties each independently include an acrylate, a methacrylate, one or more vinyl ethers, or one or more (meth)allyl ethers or a combination thereof. In one embodiment, the one or more aryl-containing compounds including one or more ethylenically unsaturated moieties each independently include an acrylate, a methacrylate, or a combination thereof. In one embodiment, the one or more aryl-containing compounds including one or more ethylenically unsaturated moieties each independently include one or more bisphenol-A epoxy diacrylate oligomers, one or more urethane methacrylates, one or more ethoxylated bisphenol-A diacrylate oligomers, one or more 9,9-bis[4-(2-acryloyloxyalkoxy)phenyl]fluorenes, one or more ethoxylated bisphenol-A diacrylates, or a combination thereof.

In one embodiment, the one or more aryl-containing compounds including one or more ethylenically unsaturated moieties each independently include one or more bisphenol-A epoxy diacrylate oligomers and one or more urethane methacrylates. In one embodiment, the one or more aryl-containing compounds including one or more ethylenically unsaturated moieties each independently include one or more bisphenol-A epoxy diacrylate oligomers and one or more ethoxylated bisphenol-A diacrylate oligomers. In one embodiment, the one or more aryl-containing compounds including one or more ethylenically unsaturated moieties each independently include one or more bisphenol-A epoxy diacrylate oligomers, one or more ethoxylated bisphenol-A diacrylate oligomers, and one or more 9,9-bis[4-(2-acryloyloxyalkoxy)phenyl]fluorenes.

In one embodiment, the one or more aryl-containing compounds including one or more ethylenically unsaturated moieties each independently include one or more 9,9-bis[4-(2-acryloyloxyalkoxy)phenyl]fluorenes. In one embodiment, the one or more aryl-containing compounds including one or more ethylenically unsaturated moieties each independently include one or more 9,9-bis[4-(2-acryloyloxyalkoxy)phenyl]fluorenes and one or more ethoxylated bisphenol-A diacrylates. In one embodiment, the one or more bisphenol-A epoxy diacrylate oligomers each independently include propoxylated Bis-A diacrylate, 2,2 Bis[4-(acryloxy polyethoxy]phenyl)propane, or combinations thereof.

In one embodiment, the one or more bisphenol-A epoxy diacrylate oligomers each independently include:

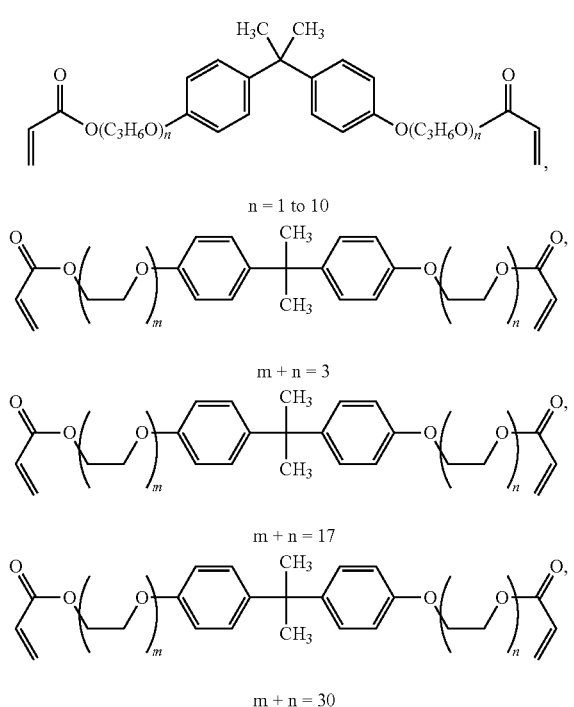

m + n = 3 m + n = 17 m + n = 30 or combinations thereof. In one embodiment, the one or more ethoxylated bisphenol-A diacrylate oligomers each independently include 2,2 Bis[4-(acryloxy polyethoxy]phenyl) ethane.

In one embodiment, the one or more ethoxylated bisphenol-A diacrylate oligomers each independently include

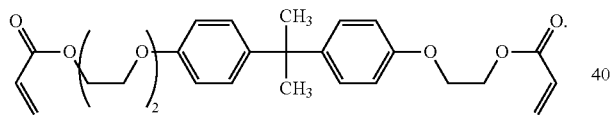

In one embodiment, the one or more 9,9-bis[4-(2-acryloyloxyalkoxy)phenyl]fluorenes each independently include 9,9-bis[4-(2-acryloyloxyethoxy)phenyl]fluorene. In one embodiment, the one or more 9,9-bis[4-(2-acryloyloxyalkoxy)phenyl]fluorenes each independently include

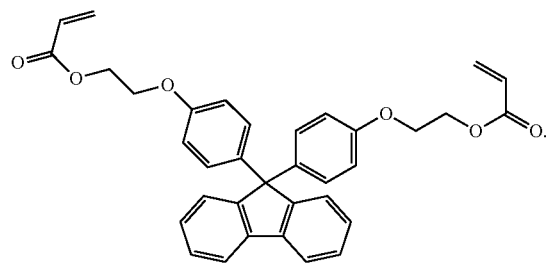 [SMILES: C=CC(=O)OCCOc1ccc(C2(c3ccc(OCCOC(=O)C=C)cc3)c3ccccc3-c3ccccc32)cc1]

In one embodiment, the one or more aryl-containing compounds including one or more ethylenically unsaturated moieties each independently include from about 30 weight percent to about 98 weight percent. In one embodiment, the one or more aryl-containing compounds including one or more ethylenically unsaturated moieties each independently include from about 45 weight percent to about 95 number weight percent. In one embodiment, the one or more aryl-containing compounds including one or more ethylenically unsaturated moieties each independently include from about 60 weight percent to about 90 weight percent.

In one embodiment, the one or more reactive diluent compounds including an ethylenically unsaturated moiety each independently include an acrylate, a methacrylate, one or more vinyl ethers, or one or more (meth)allyl ethers or a combination thereof. In one embodiment, the one or more reactive diluent compounds including an ethylenically unsaturated moiety each independently include one or more acrylates. In one embodiment, the one or more reactive diluent compounds including an ethylenically unsaturated moiety each independently include a $C_6$-aromatic-substituted phenoxy($C_1$-$C_{10}$) alkyl acrylate, an unsubstituted phenoxy($C_1$-$C_{10}$) alkyl acrylate, a substituted ($C_1$-$C_{20}$) alkyl acrylate, or a combination thereof.

In one embodiment, the one or more reactive diluent compounds including an ethylenically unsaturated moiety each independently include o-phenylphenoxyethyl acrylate, 2-phenoxyethyl acrylate, isobornyl acrylate, hexadiol acrylate, ethoxylated ethyl acrylate, or a combination thereof. In one embodiment, the one or more reactive diluent compounds including an ethylenically unsaturated moiety each independently include o-phenylphenoxyethyl acrylate. In one embodiment, the one or more reactive diluent compounds including an ethylenically unsaturated moiety each independently include

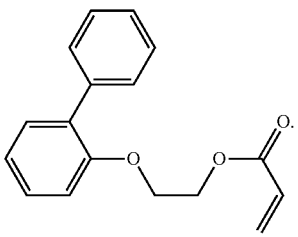 [SMILES: C=CC(=O)OCCOc1ccccc1-c1ccccc1]

In one embodiment, the one or more reactive diluent compounds including an ethylenically unsaturated moiety each independently include 2-phenoxyethyl acrylate. In one embodiment, the one or more reactive diluent compounds including an ethylenically unsaturated moiety each independently include

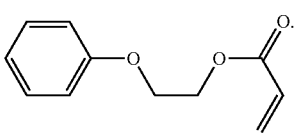

In one embodiment, the one or more reactive diluent compounds including an ethylenically unsaturated moiety each independently include isobornyl acrylate. In one embodiment, the one or more reactive diluent compounds including an ethylenically unsaturated moiety each independently include hexadiol acrylate.

In one embodiment, the one or more reactive diluent compounds including an ethylenically unsaturated moiety each independently include ethoxylated ethyl acrylate.

In one embodiment, the one or more reactive diluent compounds including an ethylenically unsaturated moiety each independently include from about 1 weight percent to about 70 weight percent. In one embodiment, the one or more reactive diluent compounds including an ethylenically unsaturated moiety each independently include from about 3 weight percent to about 69 weight percent. In one embodiment, the one or more reactive diluent compounds including an ethylenically unsaturated moiety each independently include from about 5 weight percent to about 35 weight percent.

In one embodiment, the one or more heat-stabilizing compounds each independently include one or more thiosynergist heat stabilizers.

In one embodiment, the one or more heat-stabilizing compounds each independently include didodecyl 3,3'-thiodipropionate, dilauryl thiopropionate; thiodiethylene bis[3-(3,5-di-tert-butyl-4-hydroxyphenyl)propionate], 4,6-bis(dodecylthiomethyl)-o-cresol, 2,4-bis(dodecylthiomethyl)-6-methylphenol, or a combination thereof. In one embodiment, the one or more heat-stabilizing compounds each independently include tone photo initiators. In one embodiment, the one or more alpha-ketone photo initiators each independently include benzophenone, 2-hydroxy-2-methyl-1-phenyl-propane-1-one, 1-hydroxy-cyclohexyl-phenol-ketone, or a combination thereof. In one embodiment, the one or more radical-inducing photo initiators each independently include benzophenone.

In one embodiment, the one or more radical-inducing photo initiators each independently include 2-hydroxy-2-methyl-1-phenyl-propane-1-one. In one embodiment, the one or more radical-inducing photo initiators each independently include 1-hydroxy-cyclohexyl-phenol-ketone.

In one embodiment, the one or more photo initiators each independently include from about 0.001 weight percent to about 5.0 weight percent. In one embodiment, the one or more photo initiators each independently include from about 0.05 weight percent to about 1.0 weight percent. In one embodiment, the one or more photo initiators each independently include from about 0.1 weight percent to about 0.3 weight percent. In one embodiment, the one or more photo initiators absorb radiation from about 250 nanometers to about 390 nanometers.

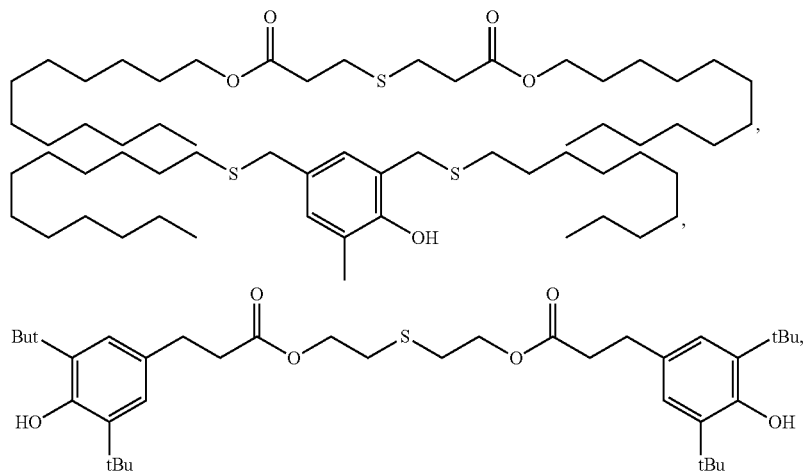

or combinations thereof.

In one embodiment, the one or more heat-stabilizing compounds each independently include didodecyl 3,3'-thiodipropionate. In one embodiment, the one or more heat-stabilizing compounds each independently include dilauryl thiodipropionate. In one embodiment, the one or more heat-stabilizing compounds each independently include thiodiethylene bis[3-(3,5-di-tert-butyl-4-hydroxyphenyl)propionate]. In one embodiment, the one or more heat-stabilizing compounds each independently include 4,6-bis(dodecylthiomethyl)-o-cresol. In one embodiment, the one or more heat-stabilizing compounds each independently include 2,4-Bis(dodecylthiomethyl)-6-methylphenol.

In one embodiment, the one or more heat-stabilizing compounds each independently include from about 0.001 weight percent to about 10 weight percent. In one embodiment, the one or more heat-stabilizing compounds each independently include from about 0.01 weight percent to about 5 weight percent. In one embodiment, the one or more heat-stabilizing compounds each independently include from about 0.05 weight percent to about 0.15 weight percent.

In one embodiment, the one or more photo initiators each independently include radical-inducing photo initiators. In one embodiment, the one or more radical-inducing photo initiators each independently include one or more alpha-ke- In one embodiment, the one or more photo initiators each independently include non-yellowing radical inducing photo initiators.

The present invention provides a radiation-curable composition for making optically clear high refractive index materials. The composition includes: one or more aryl-containing compounds including one or more ethylenically unsaturated moieties, wherein the one or more aryl-containing compounds including one or more ethylenically unsaturated moieties each independently include an acrylate, a methacrylate, or a combination thereof; one or more reactive diluent compounds including an ethylenically unsaturated moiety, wherein the one or more reactive diluent compounds including an ethylenically unsaturated moiety each independently include one or more acrylates; one or more heat-stabilizing compounds, wherein the one or more heat-stabilizing compounds each independently include one or more thiosynergist heat stabilizers; and one or more radical inducing photo initiators, wherein the one or more photo initiators each independently include radical-inducing photo initiators that absorb radiation from about 200 nanometers to about 400 nanometers.

The present invention provides an ultraviolet radiation-curable composition for making optically clear high refractive index materials. The composition includes: one or more aryl-containing compounds including one or more ethylenically unsaturated moieties, wherein the one or more aryl-containing compounds including one or more ethylenically unsaturated moieties each independently include one or more bisphenol-A epoxy diacrylate oligomers, one or more urethane methacrylates, one or more ethoxylated bisphenol-A diacrylate oligomers, one or more 9,9-bis[4-(2-acryloyloxyalkoxy)phenyl]fluorenes, one or more ethoxylated bisphenol-A diacrylates, or a combination thereof; one or more reactive diluent compounds including an ethylenically unsaturated moiety, wherein the one or more reactive diluent compounds including an ethylenically unsaturated moiety each independently include o-phenylphenoxyethyl acrylate, 2-phenoxyethyl acrylate, isobornyl acrylate, hexadiol acrylate, ethoxylated ethyl acrylate, or a combination thereof; one or more heat-stabilizing compounds, wherein the one or more heat-stabilizing compounds each independently include didodecyl 3,3'-thiodipropionate, dilaaryl thiodipropionate, thiodiethylene bis[3-(3,5-di-tert-butyl-4-hydroxyphenyl) propionate], 4,6-bis (dodecylthiomethyl)-o-cresol, 2,4-bis (dodecylthiomethyl)-6-methylphenol, or a combination thereof; and one or more non-yellowing radical inducing photo initiators, wherein the one or more non-yellowing radical-inducing photo initiators each independently include benzophenone, 2-hydroxy-2-methyl-1-phenyl-propane-1-one, 1-hydroxy-cyclohexyl-phenol-ketone, or a combination thereof.

The present invention provides a method of preparing an optically clear high refractive index coating. The method includes: applying a radiation-curable composition to a substrate, wherein the radiation-curable composition includes: one or more aryl-containing compounds including one or more ethylenically unsaturated moieties: one or more reactive diluent compounds including an ethylenically unsaturated moiety; one or more heat-stabilizing compounds; one or more photo initiators, wherein the one or more photo initiators absorb radiation from about 200 nanometers to about 400 nanometers; and exposing the radiation-curable composition on the substrate to radiation from about 200 nanometers to about 400 nanometers to provide a cured high refractive index coating, wherein the cured high refractive index coating has a refractive index from about 1.50 to about 1.65 with radiation at about 589 nanometers.

In one embodiment, the cured high refractive index coating has a refractive index from about 1.52 to about 1.62 with radiation at about 589 nanometers. In one embodiment, the cured high refractive index coating has a glass transition temperature (Tg) from about from about 75° C. to about 115° C. In one embodiment, the cured high refractive index coating has a glass transition temperature (Tg) from about 80° C. to about 110° C. In one embodiment, the cured high refractive index coating has a glass transition temperature (Tg) from about 87° C. to about 101° C.

In one embodiment, the high refractive index coating has shrinkage during curing from about 0.1 percent to about 20 percent. In one embodiment, the high refractive index coating has shrinkage during curing from about 0.1 percent to about 10 percent. In one embodiment, the high refractive index coating has shrinkage during curing from about 1 percent to about 10 percent.

In one embodiment, the cured high refractive index coating is chemically stable, dimensionally stable, or a combination thereof at a temperature at about 250° C. to about 270° C. for about one minute to about 10 minutes. In one embodiment, the cured high refractive index coating is chemically stable, dimensionally stable, or a combination thereof at a temperature at about 255° C. to about 265° C. for about three minutes to about 7 minutes. In one embodiment, the cured high refractive index coating is chemically stable, dimensionally stable, or a combination thereof at a temperature at about 260° C. for about five minutes.

In one embodiment, the high refractive index coating is has a viscosity from about 500 centipoise to about 20,000 centipoise at about room temperature. In one embodiment, the high refractive index coating is has a viscosity from about 1000 centipoise to about 10,000 centipoise at about room temperature.

In one embodiment, the substrate includes silicon, silicon dioxide, silicon nitride, aluminum gallium arsenide, aluminum indium gallium phosphide, gallium nitride, gallium arsenide, indium gallium phosphide, indium gallium nitride, indium gallium arsenide, aluminum oxide, glass, quartz, polycarbonates, polyesters, acrylics, polyurethanes, papers, ceramics, metals, or a combination thereof.

In one embodiment, the exposing occurs at a temperature from about 10° C. to about 50° C. In one embodiment, the exposing occurs at about room temperature.

In one embodiment, the exposing occurs for about 10 seconds to about 600 seconds. In one embodiment, the exposing occurs for about 30 seconds to about 180 seconds.

In one embodiment, the method further includes applying a vacuum to the radiation-curable composition to the substrate prior to and during the exposing.

The present invention provides a method of preparing an optically clear high refractive index coating. The method includes: applying a radiation-curable composition to a substrate, wherein the radiation-curable composition includes: one or more aryl-containing compounds including one or more ethylenically unsaturated moieties, wherein the one or more aryl-containing compounds including one or more ethylenically unsaturated moieties each independently include one or more bisphenol-A epoxy diacrylate oligomers, one or more urethane methacrylates, one or more ethoxylated bisphenol-A diacrylate oligomers, one or more 9,9-bis[4-(2-acryloyloxyalkoxy)phenyl]fluorenes, one or more ethoxylated bisphenol-A diacrylates, or a combination thereof; one or more reactive diluent compounds including an ethylenically unsaturated moiety, wherein the one or more reactive diluent compounds including an ethylenically unsaturated moiety each independently include o-phenylphenoxyethyl acrylate, 2-phenoxyethyl acrylate, isobornyl acrylate, hexadiol acrylate, ethoxylated ethyl acrylate, or a combination thereof; one or more heat-stabilizing compounds, wherein the one or more heat-stabilizing compounds each independently include didodecyl 3,3'-thiodipropionate, dilauryl propionate, thiodiethylene bis[3-(3,5-di-tert-butyl-4-hydroxyphenyl) propionate], 4,6-bis (dodecylthiomethyl)-o-cresol, 2,4-bis (dodecylthiomethyl)-6-methylphenol, or a combination thereof; one or more radical inducing photo initiators, wherein the one or more radical-inducing photo initiators each independently include benzophenone, 2-hydroxy-2-methyl-1-phenyl-propane-1-one, 1-hydroxy-cyclohexyl-phenol-ketone, or a combination thereof; and exposing the radiation-curable composition on the substrate to radiation from about 200 nanometers to about 400 nanometers to provide a cured high refractive index coating, wherein the cured high refractive index coating has a refractive index from about 1.50 to about 1.65.

The present invention provides a method of preparing an optically clear high refractive index coating. The method includes: applying a radiation-curable composition to a substrate, wherein the radiation-curable composition includes: one or more aryl-containing compounds including one or more ethylenically unsaturated moieties, wherein the one or more aryl-containing compounds including one or more ethylenically unsaturated moieties each independently include one or more bisphenol-A epoxy diacrylate oligomers, one or more urethane methacrylates, one or more ethoxylated bisphenol-A diacrylate oligomers, one or more 9,9-bis[4-(2-acryloyloxyalkoxy)phenyl]fluorenes, one or more ethoxylated bisphenol-A diacrylates; one or more reactive diluent compounds including an ethylenically unsaturated moiety, wherein the one or more reactive diluent compounds including an ethylenically unsaturated moiety each independently include o-phenylphenoxyethyl acrylate, 2-phenoxyethyl acrylate, isobornyl acrylate, hexadiol acrylate, ethoxylated ethyl acrylate, or a combination thereof; one or more heat-stabilizing compounds, wherein the one or more heat-stabilizing compounds each independently include didodecyl 3,3'-thiodipropionate, dilauryl thiodipropionate, thiodiethylene bis[3-(3,5-di-tert-butyl-4-hydroxyphenyl)propionate], 4,6-bis(dodecylthiomethyl)-o-cresol, 2,4-bis(dodecylthiomethyl)-6-methylphenol, or a combination thereof; one or more non-yellowing radical inducing photo initiators, wherein the one or more non-yellowing radical-inducing photo initiators each independently include benzophenone, 2-hydroxy-2-methyl-1-phenyl-propane-1-one, 1-hydroxy-cyclohexyl-phenol-ketone, or a combination thereof; applying a vacuum to the radiation-curable composition to the substrate; and exposing the radiation-curable composition on the substrate to radiation from about 200 nanometers to about 400 nanometers at about room temperature for about 2 seconds to about 1000 seconds to provide a cured high refractive index coating, wherein the cured high refractive index coating has a refractive index from about 1.50 to about 1.65.

DETAILED DESCRIPTION OF THE INVENTION

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993, *The American Heritage Dictionary of the English Language*, Houghton Mifflin, Boston Mass., 1981, and *Hawley's Condensed Chemical Dictionary*, 14$^{th}$ edition, Wiley Europe, 2002.

The following explanations of certain terms are meant to be illustrative rather than exhaustive. These terms have their ordinary meanings given by usage in the art and in addition include the following explanations.

As used herein, the term "about" refers to a variation of 10 percent of the value specified; for example about 50 percent carries a variation from 45 to 55 percent.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "actinically" in reference to curing or polymerizing of a polymerizable composition or material or a matrix-forming material means that the curing (e.g., cross-linked and/or polymerized) is performed by actinic irradiation, such as, for example, ultraviolet irradiation, ionized radiation (e.g. Gamma ray or X-ray irradiation), microwave irradiation, and the like. Thermal curing or actinic curing methods are well-known to a person skilled in the art.

As used herein, the term "alkyl" refers to a $C_1$-$C_{18}$ hydrocarbon containing normal, secondary, tertiary or cyclic carbon atoms. Examples are methyl, ethyl, 1-propyl, 2-propyl, 1-butyl, 2-methyl-1-propyl (iso-butyl, —$CH_2CH(CH_3)_2$), 2-butyl (sec-butyl, —$CH(CH_3)CH_2CH_3$), 2-methyl-2-propyl (tert-butyl, —$C(CH_3)_3$), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl.

The alkyl can be a monovalent hydrocarbon radical, as described and exemplified above, or it can be a divalent hydrocarbon radical (i.e., alkylene).

The alkyl can optionally be substituted with one or more alkoxy, halo, haloalkyl, hydroxy, hydroxyalkyl, aryl, heteroaryl, heterocycle, cycloalkyl, alkanoyl, alkoxycarbonyl, amino, imino, alkylamino, acylamino, nitro, trifluoromethyl, trifluoromethoxy, carboxy, carboxyalkyl, keto, thioxo, alkylthio, alkylsulfinyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, $NR^xR^y$ and/or $COOR^x$, wherein each $R^x$ and $R^y$ are independently H, alkyl, alkenyl, aryl, heteroaryl, heterocycle, cycloalkyl or hydroxy. The alkyl can optionally be interrupted with one or more non-peroxide oxy (—O—), thio (—S—), imino (—N(H)—), methylene dioxy (—$OCH_2O$—), carbonyl (—C(=O)—), carboxy (—C(=O)O—), carbonyldioxy (—OC(=O)O—), carboxylato (—OC(=O)—), imino (C=NH), sulfinyl (SO) or sulfonyl ($SO_2$). Additionally, the alkyl can optionally be at least partially unsaturated, thereby providing an alkenyl.

As used herein, the term "alkenyl" refers to a $C_2$-$C_{18}$ hydrocarbon containing normal, secondary, tertiary or cyclic carbon atoms with at least one site of unsaturation, i.e., a carbon-carbon, sp² double bond. Examples include, but are not limited to: ethylene or vinyl (—CH=CH$_2$), allyl (—CH$_2$CH=CH$_2$), cyclopentenyl (—C$_5$H$_7$), and 5-hexenyl (—CH$_2$CH$_2$CH$_2$CH$_2$CH=CH$_2$). The alkenyl can be a monovalent hydrocarbon radical, as described and exemplified above, or it can be a divalent hydrocarbon radical (i.e., alkenylene).

The alkenyl can optionally be substituted with one or more alkoxy, halo, haloalkyl, hydroxy, hydroxyalkyl, aryl, heteroaryl, heterocycle, cycloalkyl, alkanoyl, alkoxycarbonyl, amino, imino, alkylamino, acylamino, nitro, trifluoromethyl, trifluoromethoxy, carboxy, carboxyalkyl, keto, thioxo, alkylthio, alkylsulfinyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, NR$^x$R$^y$ and/or COOR$^x$, wherein each R$^x$ and R$^y$ are independently H, alkyl, alkenyl, aryl, heteroaryl, heterocycle, cycloalkyl or hydroxy. Additionally, the alkenyl can optionally be interrupted with one or more non-peroxide oxy (—O—), thio (—S—), imino (—N(H)—), methylene dioxy (—OCH$_2$O—), carbonyl (—C(=O)—), carboxy (—C(=O)O—), carbonyldioxy (—OC(=O)O—), carboxylato (—OC(=O)—), imine (C=NH), sulfinyl (SO) or sulfonyl (SO$_2$).

As used herein, the term "alkylene" refers to a saturated, branched or straight chain or cyclic hydrocarbon radical of 1-18 carbon atoms, and having two monovalent radical centers derived by the removal of two hydrogen atoms from the same or different carbon atoms of a parent alkane. Typical alkylene radicals include, but are not limited to: methylene (—CH$_2$—), 1,2-ethylene (—CH$_2$CH$_2$—), 1,3-propylene (—CH$_2$CH$_2$CH$_2$—), 1,4-butylene (—CH$_2$CH$_2$CH$_2$CH$_2$—), and the like.

The alkylene can optionally be substituted with one or more alkoxy, halo, haloalkyl, hydroxy, hydroxyalkyl, aryl, heteroaryl, heterocycle, cycloalkyl, alkanoyl, alkoxycarbonyl, amino, imino, alkylamino, acylamino, nitro, trifluoromethyl, trifluoromethoxy, carboxy, carboxyalkyl, keto, thioxo, alkylthio, alkylsulfinyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, NR$^x$R$^y$ and/or COOR$^x$, wherein each R$^x$ and R$^y$ are independently H, alkyl, alkenyl, aryl, heteroaryl, heterocycle, cycloalkyl or hydroxy. Additionally, the alkylene can optionally be interrupted with one or more non-peroxide oxy (—O—), thio (—S—), imino (—N(H)—), methylene dioxy (—OCH$_2$O—), carbonyl (—C(=O)—), carboxy (—C(=O)O—), carbonyldioxy (—OC(=O)O—), carboxylato (—OC(=O)—), imine (C=NH), sulfinyl (SO) or sulfonyl (SO$_2$). Moreover, the alkylene can optionally be at least partially unsaturated, thereby providing an alkenylene.

As used herein, the term "alkenylene" refers to an unsaturated, branched or straight chain or cyclic hydrocarbon radical of 2-18 carbon atoms, and having two monovalent radical centers derived by the removal of two hydrogen atoms from the same or two different carbon atoms of a parent alkene. Typical alkenylene radicals include, but are not limited to 1,2-ethenylene (—CH=CH—).

The alkenylene can optionally be substituted with one or more alkoxy, halo, haloalkyl, hydroxy, hydroxyalkyl, aryl, heteroaryl, heterocycle, cycloalkyl, alkanoyl, alkoxycarbonyl, amino, imino, alkylamino, acylamino, nitro, trifluoromethyl, trifluoromethoxy, carboxy, carboxyalkyl, keto, thioxo, alkylthio, alkylsulfinyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, NR$^x$R$^y$ and/or COOR$^x$, wherein each R$^x$ and R$^y$ are independently H, alkyl, alkenyl, aryl, heteroaryl, heterocycle, cycloalkyl or hydroxy. Additionally, The alkenylene can optionally be interrupted with one or more non-peroxide oxy (—O—), thio (—S—), imino (—N(H)—), methylene dioxy (—OCH$_2$O—), carbonyl (—C(=O)—), carboxy (—C(=O)O—), carbonyldioxy (—OC(=O)O—), carboxylato (—OC(=O)—), imine (C=NH), sulfinyl (SO) or sulfonyl (SO$_2$).

As used herein, the term "alkoxy" refers to the group alkyl-O—, where alkyl is defined herein. Preferred alkoxy groups include, e.g., methoxy, ethoxy, n-propoxy, iso-propoxy, n-butoxy, tert-butoxy, sec-butoxy, n-pentoxy, n-hexoxy, 1,2-dimethylbutoxy, and the like.

The alkoxy can optionally be substituted with one or more halo, haloalkyl, hydroxy, hydroxyalkyl, aryl, heteroaryl, heterocycle, cycloalkyl, alkanoyl, alkoxycarbonyl, amino, imino, alkylamino, acylamino, nitro, trifluoromethyl, trifluoromethoxy, carboxy, carboxyalkyl, keto, thioxo, alkylthio, alkylsulfinyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, NR$^x$R$^y$ and/or COOR$^x$, wherein each R$^x$ and R$^y$ are independently H, alkyl, alkenyl, aryl, heteroaryl, heterocycle, cycloalkyl, or hydroxy.

As used herein, the term "aryl" refers to an unsaturated aromatic carbocyclic group of from 6 to 20 carbon atoms having a single ring (e.g., phenyl) or multiple condensed (fused) rings, wherein at least one ring is aromatic (e.g., naphthyl, dihydrophenanthrenyl, fluorenyl, or anthryl). Preferred aryls include phenyl, naphthyl and the like. The aryl can optionally be a divalent radical, thereby providing an arylene.

The aryl can optionally be substituted with one or more alkyl, alkenyl, alkoxy, halo, haloalkyl, hydroxy, hydroxyalkyl, aryl, heteroaryl, heterocycle, cycloalkyl, alkanoyl, alkoxycarbonyl, amino, imino, alkylamino, acylamino, nitro, trifluoromethyl, trifluoromethoxy, carboxy, carboxyalkyl, keto, thioxo, alkylthio, alkylsulfinyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, NR$^x$R$^y$ and/or COOR$^x$, wherein each R$^x$ and R$^y$ are independently H, alkyl, alkenyl, aryl, heteroaryl, heterocycle, cycloalkyl, or hydroxy.

As used herein, the terms "aryloxy" and "arylalkoxy" refer to, respectively, an aryl group bonded to an oxygen atom and an aralkyl group bonded to the oxygen atom at the alkyl moiety. Examples include but are not limited to phenoxy, naphthyloxy, and benzyloxy.

As used herein, the term "coating" refers to partial coating and adhesion or adsorption in addition to coating the whole surface of an object (e.g., core) which is to be coated.

As used herein, the term "degree of substitution" of a polymeric species refers to the ratio of the average number of substituent groups, for example an alkyl substituent, per monomeric unit of the polymer as defined.

As used herein, the term "electromagnetic radiation" refers to a series of waves that are propagated by simultaneous periodic variations of electric and magnetic field intensity and that include radio waves, infrared, visible light, ultraviolet, X rays, and gamma rays.

As used herein, the terms "ethylenically unsaturated group" or "olefinically unsaturated group" are employed herein in a broad sense and is intended to encompass any groups containing at least one C=C group. Exemplary ethylenically unsaturated groups include without limitation acryloyl, methacryloyl, allyl, vinyl, styrenyl, or other C=C containing groups.

As used herein, the term "halo" refers to fluoro, chloro, bromo, and iodo. Similarly, the term "halogen" refers to fluorine, chlorine, bromine, and iodine.

As used herein, the term "haloalkyl" refers to alkyl as defined herein substituted by 1-4 halo groups as defined herein, which may be the same or different. Representative haloalkyl groups include, by way of example, trifluoromethyl, 3-fluorododecyl, 12,12,12-trifluorododecyl, 2-bromooctyl, 3-bromo-6-chloroheptyl, and the like.

As used herein, the terms "include," "for example," "such as," and the like are used illustratively and are not intended to limit the present invention.

As used herein, the term "keto" refers to (C=O).

As to any of the groups described herein, which contain one or more substituents, it is understood, of course, that such groups do not contain any substitution or substitution patterns which are sterically impractical and/or synthetically nonfeasible. In addition, the compounds of this disclosed subject matter include all stereochemical isomers arising from the substitution of these compounds.

Selected substituents within the compounds described herein are present to a recursive degree. In this context, "recursive substituent" means that a substituent may recite another instance of itself. Because of the recursive nature of such substituents, theoretically, a large number may be present in any given claim. One of ordinary skill in the art of medicinal chemistry and organic chemistry understands that the total number of such substituents is reasonably limited by the desired properties of the compound intended. Such properties include, by of example and not limitation, physical properties such as molecular weight, solubility or log P, application properties such as activity against the intended target, and practical properties such as ease of synthesis.

Recursive substituents are an intended aspect of the disclosed subject matter. One of ordinary skill in the art of medicinal and organic chemistry understands the versatility of such substituents. To the degree that recursive substituents are present in an claim of the disclosed subject matter, the total number will be determined as set forth above.

As used herein, the term "liquid" refers to a substance that undergoes continuous deformation under a shearing stress. See, e.g., *Concise Chemical and Technical Dictionary*, 4$^{th}$ Edition, Chemical Publishing Co., Inc., p. 707, New York, N.Y. (1986).

As used herein, the term "light" refers to an electromagnetic radiation in the wavelength range including infrared, visible, ultraviolet, and X rays.

As used herein, the term "macromer" refers to a medium to high molecular weight compound or polymer that contains functional groups capable of undergoing further polymerizing/crosslinking reactions. Medium and high molecular weight typically means average molecular weights greater than 700 Daltons. In one aspect, the macromer contains ethylenically unsaturated groups and can be polymerized actinically or thermally.

As used herein, the term "melting temperature (TO)" of a polymer refers to the temperature at which the polymer changes from a solid to a liquid phase.

As used herein, the term "(meth)acrylate" is a shorthand reference to acrylate, methacrylate, or combinations thereof, and "(meth)acrylic" is a shorthand reference to acrylic, methacrylic, or combinations thereof.

As used herein, the term "molar absorptivity" refers to the absorbance of light per unit path length (usually the centimeter) and per unit of concentration (moles per liter).

As used herein, the term "molecular weight" refers to a weight-average molecular weight, as is well known in the art.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or from about two to about four.

As used herein, the term "oxo" refers to =O.

As used herein, the term "photoinitiator" refers to a species that absorbs light and effects a chemical reaction.

As used herein, the term "photopolymerization" refers to using a light source to form or crosslink a polymeric material.

As used herein, the term "photopolymerizable system" or "photopolymerizable formulation" refers to a mixture of photopolymerizable or cross-linkable monomers, oligomers, and/or polymers and at least one photoinitiator.

As used herein, the term "polymer" refers to a molecule of one or more repeating monomeric residue units covalently bonded together by one or more repeating chemical functional groups. The term includes all polymeric forms such as linear, branched, star, random, block, graft, and the like. It includes homopolymers formed from a single monomer, copolymer formed from two or more monomers, terpolymers formed from three or more polymers, and polymers formed from more than three monomers. Differing forms of a polymer may also have more than one repeating, covalently bonded functional group.

As used herein, the term "polymerization" refers to the process whereby molecules undergo reactions to form or cross-link a polymeric material.

As used herein, the term "polymerizable" refers to the ability of a molecule to undergo polymerization.

As used herein, the terms "polymerizable moiety" and "polymerizable residue" refer to a chemical functionality capable of undergoing a polymerization reaction or cross-linking reaction to form a higher molecular weight compound and/or a more highly cross-linked structure. Suitable examples include methacryloyloxy groups, acryloyloxy groups, methacryl amide groups, acryl amide groups, styryl groups, vinyl groups, vinyl carbonate groups, vinyl carbamate groups, allyl carbonate groups, or allyl carbamate groups.

As used herein, the term "polymerization inhibitor" refers to one or more compositions, compounds, molecules, etc., that are capable of inhibiting or substantially inhibiting the polymerization of the polymerizable component when the photoinitiating light source is on or off. Polymerization inhibitors typically react very quickly with radicals and effectively stop a polymerization reaction. Inhibitors cause an inhibition time during which little to no photopolymer forms (i.e., only very small chains). Typically, photopolymerization occurs only after nearly 100% of the inhibitor is reacted.

As used herein, the term "polyalkylene group" is a group having two or more CH$_2$ groups linked to one another. The polyalkylene group can be represented by the formula —(CH$_2$)$_a$, where "a" is an integer of from 2 to 500.

As used herein, the term "poly(oxyalkylene)" group is a polymeric chain of atoms containing a monomeric repeating unit wherein two carbon atoms of an alkylene group are bonded to oxygen atoms. The carbon atoms of the alkylene group repeating unit may themselves bear additional radicals. For example, if the alkylene group is ethylene, and the ethylene groups are unsubstituted, the poly(oxyalkylene) is a poly(oxyethylene). If each ethylene group bears a single methyl group, the resulting poly(oxyalkylene) group is a poly(oxy-1,2-propylene). If a three-carbon linear alkylene group is disposed between the oxygen atoms, the entity is a poly(oxy-1,3-propylene)

A poly(oxyalkylene) such as poly(oxyethylene) may be of a wide range of lengths, degrees of polymerization, and therefore molecular weights. Poly(oxyethylene) is of a general molecular formula of the structure [—CH$_2$—CH$_2$—O—CH$_2$—CH$_2$—O—]$_n$, where n may range from about 3 upwards to 10,000 or more. Often referred to as "polyethyleneglycol" or "PEG" derivatives, these polymeric chains are of a hydrophilic, or water-soluble, nature.

As used herein, the term "prepolymer" refers to a polymer of relatively low molecular weight, usually intermediate between that of the monomer and the final polymer or resin, which may be mixed with compounding additives, and which is capable of being hardened by further polymerization during or after a forming process.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the phrase "room temperature" refers to a temperature in the range of about 20° C. to about 30° C.

As used herein, the term "reaction mixture" may contain all reagents for a particular reaction, or may lack at least one of the reagents for the reaction.

As used herein, the term "substituted" is intended to indicate that one or more hydrogens on the atom indicated in the expression using "substituted" is replaced with a selection from the indicated group(s), provided that the indicated atom's normal valency is not exceeded, and that the substitution results in a stable compound. Suitable indicated groups include, e.g., alkyl, alkenyl, alkylidenyl, alkenylidenyl, alkoxy, halo, haloalkyl, hydroxy, hydroxyalkyl, aryl, heteroaryl, heterocycle, cycloalkyl, alkanoyl, acyloxy, alkoxycarbonyl, amino, imino, alkylamino, acylamino, nitro, trifluoromethyl, trifluoromethoxy, carboxy, carboxyalkyl, keto, thioxo, alkylthio, alkylsulfonyl, alkylsulfonyl, cyano, acetamido, acetoxy, acetyl, benzamido, benzenesulfinyl, benzenesulfonamido, benzenesulfonyl, benzenesulfonylamino, benzoyl, benzoylamino, benzoyloxy, benzyl, benzyloxy, benzyloxycarbonyl, benzylthio, carbamoyl, carbamate, isocyanato, sulfamoyl, sulfinamoyl, sulfino, sulfo, sulfoamino, thiosulfo, NR$^x$R$^y$ and/or COOR$^x$, wherein each R$^x$ and R$^y$ are independently H, alkyl, alkenyl, aryl, heteroaryl, heterocycle, cycloalkyl, or hydroxy. When a substituent is oxo (i.e., =O) or thioxo (i.e., =S) group, then two hydrogens on the atom are replaced.

As used herein, the term "Tg" refers to the glass transition temperature, i.e., the temperature at which a polymer changes from a fluid to a solid state.

As used herein, the term "ultraviolet radiation" refers to radiation whose wavelength is in the range from about 80 nm to about 400 nm.

As used herein, the term "visible light" refers to light that is perceptible to the unaided human eye, generally in the wavelength range from about 400 to 700 nm.

As used herein, "μg" denotes microgram, "mg" denotes milligram, "g" denotes gram, "μL" denotes microliter, "mL" denotes milliliter, "L" denotes liter, "nM" denotes nanomolar, "μM" denotes micromolar, "mM" denotes millimolar, "M" denotes molar, and "nm" denotes nanometer.

The present invention provides ultraviolet-curable high refractive index optically clear resins that can be used for nano-imprint lithography or step and flash imprint lithography for fabrication of wafer-level-optic lens for wafer level camera for mobile phone applications. These photopolymer materials are useful for making optical wafers by ultraviolet replication or ultraviolet micro lithography to produce wafer-level-optic lens that meet the requirements for use in wafer level cameras for mobile phone applications. For a photopolymer to be useful for making wafer-level-optic lens, four parameters should be met. First, the cured resin should be optically clear. Second, the cured resin should have a refractive index in the range of about 1.52 to about 1.65 at about 589 nm Third, the cured resin should be stable to and non-yellowing under solder reflow conditions of about 260° C. for about 5 minutes. Fourth, the cured resin should have high hardness so that it is suitable for dice cutting. The present invention provides photopolymer materials that meet these parameters.

Materials with refractive indices of about 1.52 to about 1.54 at about 589 nm are readily available. However, when refractive indices greater than 1.54 are required, the most widely used materials are brominated epoxies or brominated acrylates.

Brominated epoxies or acrylates have several problems. They are notably yellow and, thus, not suitable for wafer-level-optic lens, which have thicknesses of greater than 0.5 mm. Furthermore, brominated materials are halogenated and not environmental friendly. To address the shortcomings of brominated epoxies or acrylates, the present invention employs conjugated double bonds moieties as the main components of formulations and achieves the desired refractive index by varying the ratio or concentration of the conjugated double bond s moieties. Moreover, when the conjugated double bonds moieties are greater than six and more than one cyclic structure is present, rigidity and high Tg also are accomplished.

To design a photopolymer resin that can be used for making wafer level optics lens, the present invention utilizes four main components. First, one or more aryl-containing compounds including one or more ethylenically unsaturated moieties are used to provide high refractive index, rigidity, and hardness to the cured lens, and also minimum packing during the curing, which results in low shrinkage and good processing properties. Second, one or more reactive diluent compounds including an ethylenically unsaturated moiety are used for viscosity control. Aliphatic or hydrocarbon monomers can be used as a viscosity dilution aid, but an aromatic monomer is desired to ensure that the refractive index of the cured composition remains high. Third, one or more heat-stabilizing compounds are used to provide additional protection against long solder reflow process times where the material is subjected to temperatures of about 260° C. for more than about 5 minutes. Fourth, one or more ultraviolet absorbing non-yellow radical inducing photo initiators are used to cure the composition.

Suitable aryl-containing compounds including one or more ethylenically unsaturated moieties include, for example, an acrylate, a methacrylate, one or more vinyl ethers, or one or more (meth)allyl ethers or a combination thereof. Preferably, the one or more aryl-containing compounds including one or more ethylenically unsaturated moieties include, for example, an acrylate, a methacrylate, or a combination thereof, more preferably, one or more bisphenol-A epoxy diacrylate oligomers, one or more urethane methacrylates, one or more ethoxylated bisphenol-A diacrylate oligomers, one or more 9,9-bis[4-(2-acryloyloxyalkoxy)phenyl]fluorenes, one or more ethoxylated bisphenol-A diacrylates, or a combination thereof.

Suitable aryl-containing compounds including one or more ethylenically unsaturated moieties include, for example, one or more bisphenol-A epoxy diacrylate oligomers and one or more urethane methacrylates or one or more bisphenol-A epoxy diacrylate oligomers and one or more ethoxylated bisphenol-A diacrylate oligomers or one or more bisphenol-A epoxy diacrylate oligomers, one or more ethoxylated bisphenol-A diacrylate oligomers, and one or more 9,9-bis[4-(2-acryloyloxyalkoxy)phenyl]fluorenes.

Suitable aryl-containing compounds including one or more ethylenically unsaturated moieties include, for example, one or more 9,9-bis[4-(2-acryloyloxyalkoxy)phenyl]fluorenes and one or more ethoxylated bisphenol-A diacrylates or one or more bisphenol-A epoxy diacrylate oligomers include, for example, propoxylated Bis-A diacrylate, 2,2 Bis[4-(acryloxy polyethoxy]phenyl)propane, or combinations thereof.

Suitable bisphenol-A epoxy diacrylate oligomers include, for example;

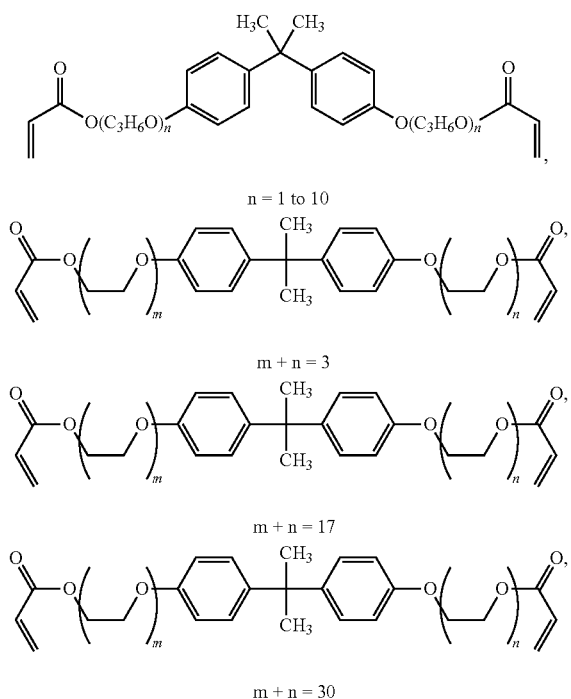

or combinations thereof. Preferably, the one or more ethoxylated bisphenol-A diacrylate oligomers include, for example, 2,2 Bis[4-(acryloxy polyethoxy]phenyl)ethane.

Suitable 9,9-bis[4-(2-acryloyloxyalkoxy)phenyl]fluorines include, for example, 9,9-bis[4-(2-acryloyloxyethoxy)phenyl]fluorine. Preferably, the one or more 9,9-bis[4-(2-acryloyloxyalkoxy)phenyl]fluorenes include, for example,

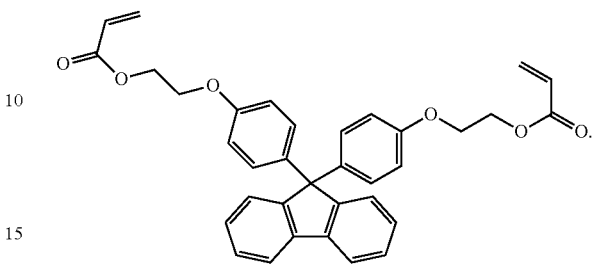

Suitable aryl-containing compounds including one or more ethylenically unsaturated moieties include, for example, the commercial products SR-349, CN-104, CN-120 from Sartomer (Sartomer USA, Exton, Pa. 19341) and 9,9-Bis[4-(2-acryloxyloxy ethoxy)phenyl]fluorine, A-BPE-20, A-BPE-30, and ABE-300 from Shin Nakamura (Shin-Nakamura Chemical Co., Ltd, Wakayama, 640-8390, Japan). Among these types of materials, 9,9-Bis[4-(2-acryloxyloxy ethoxy)phenyl]fluorene offers the higher refractive index (refractive index of about 1.65 at about 589 nm) and appears to be the most rigid material.

Preferably, the one or more aryl-containing compounds including one or more ethylenically unsaturated moieties include, for example, from about 30 weight percent to about 98 weight percent, more preferably, from about 45 weight percent to about 95 weight percent, and most preferably, from about 60 weight percent to about 90 weight percent.

Reactive diluent compounds including an ethylenically unsaturated moiety added to reduce the viscosity of the formulation to be suitable for processing.

Suitable reactive diluent compounds including an ethylenically unsaturated moiety include, for example, an acrylate, a methacrylate, one or more vinyl ethers, or one or more (meth)allyl ethers or a combination thereof, more preferably, one or more acrylates. Preferably, the one or more reactive diluent compounds including an ethylenically unsaturated moiety include, for example, a $C_6$-aromatic-substituted phenoxy($C_1$-$C_{10}$) alkyl acrylate, an unsubstituted phenoxy($C_1$-$C_{10}$) alkyl acrylate, a substituted ($C_1$-$C_{20}$) alkyl acrylate, or a combination thereof.

Suitable reactive diluent compounds including an ethylenically unsaturated moiety include, for example, o-phenylphenoxyethyl acrylate, 2-phenoxyethyl acrylate, isobornyl acrylate, hexadiol acrylate, ethoxylated ethyl acrylate, or a combination thereof.

Suitable reactive diluent compounds including an ethylenically unsaturated moiety include, for example, o-phenylphenoxyethyl acrylate (AGI Corporation, Taipei, Taiwan) and phenylphenoxyethyl acrylate (SR 339) (Sartomer USA, Exton, Pa. 19341).

The refractive index of 2-phenoxyethyl acrylate or O-phenylphenoxyethyl acrylate is about 1.52 and about 1.57 at about 589 nm respectively. As such, these monomers are used so that the diluents will have minimum negative effects on the refractive index of the lens resin formulations. Typical monomers including, for example, isobornyl acrylate, hexadiol diacrylate, ethoxylated ethyl acrylate, or the like are useful monomers for reducing the viscosity of the aryl-containing compounds including one or more ethylenically unsaturated moieties for processing. However, the refractive index of the typical monomers are in the range of about 1.47 to about 1.51 at about 589 nm, and these monomers may not be suitable in lens resins where a refractive index greater than about 1.57 at about 589 nm is needed.

Preferably, the one or more reactive diluent compounds including an ethylenically unsaturated moiety include, for example, from about 1 weight percent to about 70 weight percent, more preferably, from about 3 weight percent to about 69 weight percent, and most preferably, from about 5 weight percent to about 35 weight percent.

Heat-stabilizing compounds are added to provide protection against yellowing in the solder reflow post processing of the cured lens resins. Suitable heat-stabilizing compounds include, for example, one or more thiosynergist heat stabilizers.

Suitable heat-stabilizing compounds include, for example, didodecyl 3,3'-thiodipropionate, dilauryl thiodipropionate, thiodiethylene bis[3-(3,5-di-tert-butyl-4-hydroxyphenyl) propionate], 4,6-bis(dodecylthiomethyl)-o-cresol, 2,4-bis (dodecylthiomethyl)-6-methylphenol, or a combination thereof. Preferably, the one or more heat-stabilizing compounds include, for example, wafer-level-optic lens, the yellowing in the long wavelength photo initiators is not desirable. We found unexpectedly, that short wavelength surface cure type photo initiators can be used effectively for high depth of cure wafer-level-optic lens when combined with one or more aryl-containing compounds including one or more ethylenically unsaturated moieties and one or more reactive diluent compounds including an ethylenically unsaturated moiety. These short wavelength photo initiators provide non-yellow wafer-level-optic lens.

Preferably, the one or more photo initiators include, for example, from about 0.001 weight percent to about 5.0 weight percent, more preferably, from about 0.05 weight percent to about 1.0 weight percent, and most preferably, from about 0.1 weight percent to about 0.3 weight percent.

Suitable photo initiators absorb radiation from about 250 nanometers to about 390 nanometers.

Suitable photo initiators include, for example, non-yellowing radical inducing photo initiators.

Suitable photo initiators include, for example, Darocure 1173, Irgacure 184, and Irgacure 1173 (BASF Corporation, Florham Park, N.J. 07932).

The radiation-curable compositions, as described herein, may also include one or more polymerization inhibitors to

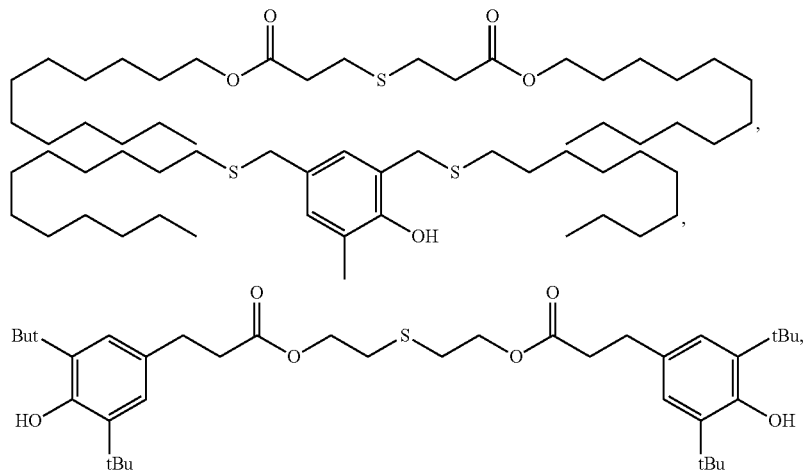

or combinations thereof.

Suitable heat-stabilizing compounds include, for example, Irganox 1035, Irganox PS 800, and Irganox 1726 (BASF Corporation, Florham Park, N.J. 07932).

Preferably, the one or more heat-stabilizing compounds include, for example, from about 0.001 weight percent to about 10 weight percent, more preferably, from about 0.01 weight percent to about 5 weight percent, and most preferably, from about 0.05 weight percent to about 0.15 weight percent.

Suitable photo initiators include, for example, radical-inducing photo initiators. Preferably, the one or more radical-inducing photo initiators include, for example, one or more alpha-ketone photo initiators, more preferably, the one or more alpha-ketone photo initiators include, for example, benzophenone, 2-hydroxy-2-methyl-1-phenyl-propane-1-one, 1-hydroxy-cyclohexyl-phenol-ketone, or a combination thereof.

It is intuitive to expect that longer wavelength radical inducing photo initiators should be used due to the high depth of cure (greater than about 200 um) of the wafer-level-optic lens. However, due to the optical clarity requirements of prolong the shelf life of the radiation-curable composition. The one or more polymerization inhibitors may include, for example, thermo polymerization inhibitors.

Suitable thermo polymerization inhibitors may include, for example, hydroquinone, p-methoxyphenol, di-tert-butyl-p-cresol, pyrogallol, tert-butyl catechol, benzoquinone, 4,4'-thiobis(3-methyl-6-tert-butylphenol), 2,2'-methylenebis(4-methyl-6-tert-butylphenol), N-nitroso-N-phenylhydroxylamine aluminum salt or combinations thereof.

Preferably, the one or more polymerization inhibitors include, for example, from about 0.0001 weight percent to about 5.0 weight percent, more preferably, from about 0.0005 weight percent to about 1.0 weight percent, and most preferably, from about 0.0002 weight percent to about 0.2 weight percent.

The radiation-curable compositions, as described herein, may also include a wide variety of adjuvants. Suitable adjuvants include solvents, diluents, resins, binders, plasticizers, inorganic or organic reinforcing or extending fillers, thixotropic agents, indicators, and the like, or combinations thereof. The amounts and types of such adjuvants and their manner of addition to the compositions will be familiar to those skilled in the art.

The present invention provides a method of preparing an optically clear high refractive index coating. The method include, for example; applying a radiation-curable composition to a substrate, wherein the radiation-curable composition include, for example; one or more aryl-containing compounds including one or more ethylenically unsaturated moieties: one or more reactive diluent compounds including an ethylenically unsaturated moiety; one or more heat-stabilizing compounds; one or more photo initiators, wherein the one or more photo initiators absorb radiation from about 200 nanometers to about 400 nanometers; and exposing the radiation-curable composition on the substrate to radiation from about 200 nanometers to about 400 nanometers to provide a cured high refractive index coating, wherein the cured high refractive index coating has a refractive index from about 1.50 to about 1.65 with radiation at about 589 nanometers.

Preferably, the cured high refractive index coating has a refractive index from about 1.52 to about 1.62 with radiation at about 589 nanometers.

Preferably, the cured high refractive index coating has a glass transition temperature (Tg) from about from about 75° C. to about 200° C., more preferably, from about from about 80° C. to about 200° C., and most preferably, about from about 90° C. to about 130° C.

Preferably, the high refractive index coating has hardness from about 70 to about 95, more preferably, from about 80 to about 95, and most preferably, from about 90 to about 95 using the Shore D Hardness Test.

Preferably, the high refractive index coating has a shrinkage during curing from about 0.1 percent to about 20 percent, more preferably, from about 0.1 percent to about 10 percent, and most preferably, from about 1 percent to about 5 percent.

Preferably, the cured high refractive index coating is chemically stable, dimensionally stable, or a combination thereof at a temperature at about 250° C. to about 270° C. for about one minute to about 10 minutes, more preferably, at a temperature at about 255° C. to about 265° C. for about three minutes to about 7 minutes, and most preferably, at a temperature at about 260° C. for about five minutes.

Preferably, the high refractive index coating is has a viscosity from about 500 centipoise to about 20,000 centipoise at about room temperature, more preferably, from about 1000 centipoise to about 10,000 centipoise at about room temperature.

Suitable substrates include, for example, silicon, silicon dioxide, silicon nitride, aluminum gallium arsenide, aluminum indium gallium phosphide, gallium nitride, gallium arsenide, indium gallium phosphide, indium gallium nitride, indium gallium arsenide, aluminum oxide, glass, quartz, polycarbonates, polyesters, acrylics, polyurethanes, papers, ceramics, metals, or a combination thereof.

Preferably, the ultraviolet (UV) exposure occurs at a temperature from about 10° C. to about 50° C., more preferably, at about room temperature. Ultraviolet (UV) exposure at ultraviolet (UV) intensity of about 20 to about 2,000 mill watt (mW)/cm$^2$ with the ultraviolet (UV) dose range from about 100 to about 3,000 mill joule (mJ)/cm$^2$ Preferably, the ultraviolet (UV) exposure occurs at a minimum ultraviolet (UV) intensity of about 20 mill watt (mW)/cm$^2$ with the ultraviolet (UV) dose range from about 400 to about 2,000 mill joule (mJ)/cm$^2$. The exposure time can be from about 2 seconds to about 1000 seconds, more preferably, for about 60 seconds to about 600 seconds.

Preferably, the method further includes, for example, applying a vacuum to the radiation-curable composition to the substrate prior to and during the exposing.

Preferably, the applied vacuum is from about 0.001 mm Hg to about 20 mm Hg, more preferably, from about 0.01 mm Hg to about 18 mm Hg, and most preferably, from about 0.01 mm Hg to about 10 mm Hg.

Concentrations, amounts, etc., of various components are often presented in a range format throughout this disclosure. The description in range format is merely for convenience and brevity and should not be construed as an inflexible limitation on the scope of the claimed invention. Accordingly, the description of a range should be considered to have specifically disclosed all the possible sub ranges as well as individual numerical values within that range. For example, description of a range such as 1% to 8% should be considered to have specifically disclosed sub ranges such as 1% to 7%, 2% to 8%, 2% to 6%, 3% to 6%, 4% to 8%, 3% to 8% etc., as well as individual numbers within that range, such as, 2%, 5%, 7% etc. This construction applies regardless of the breadth of the range and in all contexts throughout this disclosure.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicants reserve the right to physically incorporate into this specification any and all materials and information from any such patents, applications, publications, scientific articles, web sites, electronically available information, and other referenced materials or documents. Applicants reserve the right to physically incorporate into any part of this document, including any part of the written description, the claims referred to above including but not limited to any original claims.

The invention should now be illustrated with the following non-limiting examples.

EXAMPLES

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

| Description of Material | Source of Material |
|---|---|
| Urethane Methacrylate (CN 1963) | Sartomer USA, LLC 502 Thomas Jones Way Exton, PA 19341 |
| Bisphenol-A Epoxy Diacrylate Oligomer (CN 104) | Sartomer USA, LLC 502 Thomas Jones Way Exton, PA 19341 |
| Isobornyl Acrylate (SR 506) | Sartomer USA, LLC 502 Thomas Jones Way Exton, PA 19341 |
| Ethoxylated Bisphenol-A Diacrylate Monomer (SR 349) | Sartomer USA, LLC 502 Thomas Jones Way Exton, PA 19341 |
| Bisphenol-A Epoxy Diacrylate Oligomer (CN 120) | Sartomer USA, LLC 502 Thomas Jones Way Exton, PA 19341 |
| 9,9-Bis[4-(2-acryloxyloxy ethoxy) phenyl]fluorene | Shin-Nakamura Chemical Co., Ltd 687 Arimoto, Wakayama, 640-8390 Japan |
| O-Phenylphenoxyethyl Acrylate | AGI Corporation 8th Floor, 496 Jui Kuang Road, Taipei, Taiwan, 11492 |
| Phenylphenoxyethyl Acrylate (SR 339) | Sartomer USA, LLC 502 Thomas Jones Way Exton, PA 19341 |
| Irganox 1035 | BASF Corporation 100 Campus Drive Florham Park, New Jersey 07932 |
| Irganox PS 800 | BASF Corporation 100 Campus Drive Florham Park, New Jersey 07932 |
| Darocure 1173 | BASF Corporation 100 Campus Drive Florham Park, New Jersey 07932 |
| Irgacure 184 | BASF Corporation 100 Campus Drive Florham Park, New Jersey 07932 |
| Irgacure 1173 | BASF Corporation 100 Campus Drive Florham Park, New Jersey 07932 |

Examples 1-6

Preparation and Curing of Ultraviolet-Curable High Refractive Index Optically Clear Resins The formulations were prepared according to the example formulations described in the "Example" below. The formulations were made by the following general method. The monomers, oligomers, photo initiators (liquid or solid), additives (liquid or solid) and inhibitors (liquid or solid) were placed in a container and mixed using mechanical mixer or a table shaker until all solid components were completely dissolved. Heat can be applied to the container to facilitate mixing for achieving a homogeneous mixture. Heat of about 30 to about 60° C. is acceptable for the mixing process. The resulted mixture was then allowed to stand for about 30-60 minutes to degas prior to use.

The general experimental procedure is as follows. The liquid resin was placed in a glass or plastic mold with dimensions of about 10 mm wide, about 60 mm long and about 0.5 mm thick. The liquid resin was then exposed to a ultraviolet (UV) dose of about 1,000 mill joule (mJ)/cm$^2$ with a ultraviolet (UV) intensity of about 250 mill watt (mW)/cm$^2$. Physical properties of the cured resin were determined and included the refractive index at about 589 nm, the glass transition temperature (Tg), and the shrinkage of the fully cured film. The fully cured films were subjected to a heat treatment of about 260° C. for about 8 minutes and ultraviolet (UV)-Visible spectral data was then collected. The minimum requirement for % transmission after heat treatment is greater than about 80%.

The one or more aryl-containing compounds including one or more ethylenically unsaturated moieties, one or more reactive diluent compounds including an ethylenically unsaturated moiety, one or more heat-stabilizing compounds, and one or more photo initiators can be prepared by the methods known in the art or are commercially available.

These four components can be combined under "safe light" conditions using any order and manner of combination (optionally, with stirring or agitation), although it is sometimes preferable (from a shelf life and thermal stability standpoint) to add the one or more photo initiators last (and after any heating step that is optionally used to facilitate dissolution of other components). Solvent can be used, if desired, provided that the solvent is chosen so as to not react appreciably with the components of the composition. Suitable solvents include, for example, acetone, dichloromethane, and acetonitrile. The one or more aryl-containing compounds each independently comprising one or more ethylenically unsaturated moieties, the one or more reactive diluent compounds each independently comprising an ethylenically unsaturated moiety, or the combination thereof can also sometimes serve as a solvent for the other components.

Example 1

| Ingredients | Fraction |
| --- | --- |
| Urethane Methacrylate (CN 1963) | 0.35 |
| Bisphenol-A epoxy diacrylate oligomer (CN 104) | 0.399 |
| Isobornyl acrylate (SR 506) | 0.25 |
| Irganox 1035 | .001 |
| Irgacure 1173 | .02 |
| Formulation results | |
| Shrinkage (%) | 6 |
| Tg (° C.) | 87 |
| Refractive index of cured resin (589 nm, 25° C.) | 1.52 |
| Viscosity (cps, 25° C.) | 1,900 |

Example 2

| Ingredients | Fraction |
| --- | --- |
| Ethoxylated Bisphenol-A Diacrylate monomer (SR 349) | .35 |
| Bisphenol-A epoxy diacrylate oligomer (CN 120) | .53 |
| O-Phenylphenoxyethyl acrylate | .119 |
| Irganox PS 800 | .001 |
| Irgacure 184 | .02 |
| Formulation results | |
| Shrinkage (%) | 6 |
| Tg (° C.) | 95 |
| Refractive index of cured resin (589 nm, 25° C.) | 1.57 |
| Viscosity (cps, 25° C.) | 7,000 |

Example 3

| Ingredients | Fraction |
| --- | --- |
| Ethoxylated(3 mol) Bisphenol-A Diacrylate (SR 349) | .10 |
| Bisphenol-A epoxy diacrylate oligomer (CN 120) | .10 |
| O-Phenylphenoxyethyl acrylate | .05 |
| 9,9-Bis[4-(2-acryloxyloxy ethoxy) phenyl]fluorene | .749 |
| Irganox PS 800 | .001 |
| Irgacure 184 | .02 |
| Formulation results | |
| Shrinkage (%) | 4 |
| Tg (° C.) | 102 |
| Refractive index of cured resin (589 nm, 25° C.) | 1.60 |
| Viscosity (cps, 25° C.) | 10,000 |

Example 4

| Ingredients | Fraction |
| --- | --- |
| O-Phenylphenoxyethyl acrylate | .30 |
| 9,9-Bis[4-(2-acryloxyloxy ethoxy) phenyl]fluorene | .699 |
| Irganox 1035 | .001 |
| Darocure 1173 | .02 |
| Formulation results | |
| Shrinkage (%) | 3 |
| Tg (° C.) | 100 |
| Refractive index of cured resin (589 nm, 25° C.) | 1.61 |
| Viscosity (cps, 25° C.) | 6,000 |

Example 5

| Ingredients | Fraction |
| --- | --- |
| Phenoxy ethyl acrylate (SR 339) | .35 |
| 9,9-Bis[4-(2-acryloxyloxy ethoxy) phenyl]fluorene | .649 |
| Irganox 1035 | .001 |
| Darocure 1173 | .02 |
| Formulation results | |
| Shrinkage (%) | 3 |
| Tg (° C.) | 100 |
| Refractive index of cured resin (589 nm, 25° C.) | 1.59 |
| Viscosity (cps, 25° C.) | 5,000 |

Example 6

| Ingredients | Fraction |
| --- | --- |
| Ethoxylated (4 mol) Bisphenol-A Diacrylate (SR 601) | .20 |
| O-Phenylphenoxyethyl acrylate | .25 |
| 9,9-Bis[4-(2-acryloxyloxy ethoxy) phenyl]fluorene | .549 |
| Irganox PS 800 | .001 |
| Irgacure 184 | .02 |
| Formulation results | |
| Shrinkage (%) | 3 |
| Tg (° C.) | 101 |
| Refractive index of cured resin (589 nm, 25° C.) | 1.615 |
| Viscosity (cps, 25° C.) | 5,000 |

What is claimed is:

1. A radiation-curable composition for making optically clear high refractive index materials comprising:
bisphenol-A epoxy diacrylate oligomer and an ethoxylated bisphenol-A diacrylate;
o-phenylphenoxyethyl acrylate;
dilauryl thiodipropionate; and
1-hydroxy-cyclohexyl-phenol-ketone,
or
bisphenol-A epoxy diacrylate oligomer, an ethoxylated bisphenol-A diacrylate, and 9,9-bis[4-(2-acryloyloxy-alkoxy)phenyl]fluorene;
o-phenylphenoxyethyl acrylate;
dilauryl thiodipropionate; and
1-hydroxy-cyclohexyl-phenol-ketone,
or
an ethoxylated bisphenol-A diacrylate and 9,9-bis[4-(2-acryloyloxyalkoxy)phenyl]fluorene;
o-phenylphenoxyethyl acrylate;
dilauryl thiodipropionate; and
1-hydroxy-cyclohexyl-phenol-ketone.

2. The radiation-curable composition of claim 1, wherein the radiation curable composition comprises:
- bisphenol-A epoxy diacrylate oligomer and an ethoxylated bisphenol-A diacrylate;
- o-phenylphenoxyethyl acrylate;
- dilauryl thiodipropionate; and
- 1-hydroxy-cyclohexyl-phenol-ketone.

3. The radiation-curable composition of claim 1, wherein the radiation curable composition comprises:
- bisphenol-A epoxy diacrylate oligomer, an ethoxylated bisphenol-A diacrylate, and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone.

4. The radiation-curable composition of claim 1, wherein the radiation curable composition comprises:
- an ethoxylated bisphenol-A diacrylate and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone.

5. A radiation-curable composition for making optically clear high refractive index materials consisting essentially of:
- bisphenol-A epoxy diacrylate oligomer and an ethoxylated bisphenol-A diacrylate;
- o-phenylphenoxyethyl acrylate;
- dilauryl thiodipropionate; and
- 1-hydroxy-cyclohexyl-phenol-ketone, or
- bisphenol-A epoxy diacrylate oligomer, an ethoxylated bisphenol-A diacrylate, and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone, or
- an ethoxylated bisphenol-A diacrylate and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone.

6. The radiation-curable composition of claim 5, wherein the radiation curable composition consists essentially of:
- bisphenol-A epoxy diacrylate oligomer and an ethoxylated bisphenol-A diacrylate;
- o-phenylphenoxyethyl acrylate;
- dilauryl thiodipropionate; and
- 1-hydroxy-cyclohexyl-phenol-ketone.

7. The radiation-curable composition of claim 5, wherein the radiation curable composition consists essentially of:
- bisphenol-A epoxy diacrylate oligomer, an ethoxylated bisphenol-A diacrylate, and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone.

8. The radiation-curable composition of claim 5, wherein the radiation curable composition consists essentially of:
- an ethoxylated bisphenol-A diacrylate and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone.

9. An optically clear high refractive index material prepared by the process comprising:
mixing a radiation-curable composition consisting essentially of:
- bisphenol-A epoxy diacrylate oligomer and an ethoxylated bisphenol-A diacrylate;
- o-phenylphenoxyethyl acrylate;
- dilauryl thiodipropionate; and
- 1-hydroxy-cyclohexyl-phenol-ketone,
or
- bisphenol-A epoxy diacrylate oligomer, an ethoxylated bisphenol-A diacrylate, and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone,
or
- an ethoxylated bisphenol-A diacrylate and 9,9-bis[4-(2-acryloyloxyalkoxy)phenyl]fluorene;
- o-phenylphenoxyethyl acrylate;
- dilauryl thiodipropionate; and
- 1-hydroxy-cyclohexyl-phenol-ketone; and
exposing the radiation-curable composition to radiation from about 200 nanometers to about 400 nanometers to provide an optically clear high refractive index material,
wherein the optically clear high refractive index material has a refractive index from about 1.50 to about 1.65 with radiation at about 589 nanometers,
wherein the optically clear high refractive index material has a glass transition temperature (Tg) from about 75° C. to about 115° C, and
wherein the optically clear high refractive index material is chemically stable, dimensionally stable, or a combination thereof at a temperature at about 260° C for about five minutes.

* * * * *